United States Patent [19]

Kim

[11] Patent Number: 5,378,973
[45] Date of Patent: Jan. 3, 1995

[54] AUTOMATIC EYE ANGLE ADJUSTING APPARATUS FOR AN ELECTRONIC VIEW FINDER AND METHOD THEREOF

[75] Inventor: Hyoung-Gwon Kim, Seoul, Rep. of Korea

[73] Assignee: Samsung Electronics Co., Ltd., Kyungki-do, Rep. of Korea

[21] Appl. No.: 103,219

[22] Filed: Aug. 9, 1993

[30] Foreign Application Priority Data

Aug. 8, 1992 [KR] Rep. of Korea .................... 92-14251

[51] Int. Cl.6 ............................................. G05B 11/18
[52] U.S. Cl. .................................. 318/640; 318/649;
354/400; 354/199; 348/333
[58] Field of Search ................. 318/34, 590, 640, 603,
318/649; 388/906; 250/221, 201; 350/521, 515,
538; 358/224, 906, 22, 209, 909, 227, 229, 93;
354/219, 94, 407, 82, 409, 81, 199, 222, 221,
106, 400, 195.12

[56] References Cited

U.S. PATENT DOCUMENTS

| | | | |
|---|---|---|---|
| 4,482,230 | 11/1984 | Magariyama et al. | 354/219 |
| 4,577,141 | 3/1986 | Saiki et al. | 318/590 |
| 4,695,137 | 9/1987 | Jorgens et al. | 318/640 X |
| 4,725,720 | 2/1988 | Sawada et al. | 250/201 |
| 4,912,388 | 3/1990 | Tanaka et al. | 318/640 |
| 4,967,219 | 10/1990 | Morisawa et al. | 354/199 |
| 4,980,871 | 12/1990 | Sieber et al. | 318/649 X |
| 5,150,143 | 9/1992 | Ohno et al. | 354/400 |
| 5,161,025 | 11/1992 | Nakao | 358/224 |
| 5,172,147 | 12/1992 | Rockhill | 354/81 |
| 5,189,458 | 2/1993 | Miyamoto et al. | 354/400 |
| 5,255,030 | 10/1993 | Mukai et al. | 354/94 |

Primary Examiner—Paul Ip
Attorney, Agent, or Firm—Sughrue, Mion, Zinn, Macpeak & Seas

[57] ABSTRACT

An automatic eye angle adjusting apparatus in a camcorder for automatically moving an electronic view finder in accordance with camcorder set motion includes a set motion detector for output of a control signal in accordance with intentional movement of the camcorder and an eye angle adjustor for adjusting an angle of the electronic view finder in response to the control signal. The automatic eye angle adjusting apparatus eliminates the discomfort of manually adjusting an angle of the electronic view finder and prevent a trembling motion resulting from angle adjustment of the electronic view finder from being recorded along with the desired image. A method for operating the adjusting apparatus is also disclosed.

12 Claims, 3 Drawing Sheets

AUTOMATIC EYE ANGLE ADJUSTING APPARATUS FOR AN ELECTRONIC VIEW FINDER AND METHOD THEREOF

BACKGROUND OF THE INVENTION

Field of the Invention

The present invention relates to a camcorder. More particularly, the present invention relates to an automatic eye angle adjusting apparatus for a camcorder. According to one aspect of the invention, the adjusting apparatus automatically moves an electronic view finder (EVF) in accordance with camcorder set, i.e., body, motion to thereby eliminate the discomfort of manually adjusting EVF angle and to prevent a trembling motion in a recorded scene resulting from manual angle adjustment of the EVF. A method for operating the adjusting apparatus is also disclosed.

Description of the Prior Art

Conventionally, a camcorder is heavy. It should be put on a user's shoulder and supported with two hands to thereby prevent a trembling motion during filming to thereby produce a fine quality picture.

In the case of a small-sized camcorder, e.g., an 8 mm camcorder, there is little need to put the camcorder on the user's shoulder while filming. However in order to get a high quality picture, two hands must still be used to support the camcorder to thereby prevent trembling motion during filming.

Furthermore, when a filming direction is changed to follow an object, the EVF contacting the eye of the user should be moved to thereby adjust the viewing angle. However, in the case of the conventional camcorder, the user has to adjust the viewing angle with one hand while supporting the camcorder with the other in order to perform the filming while viewing through the EVF, especially when the filming is performed by moving a set either up/down or left/right (especially up/down) to follow the object of interest.

Accordingly, whenever the set is moved, the view finder should also be moved. Furthermore, with only one hand supporting the body of the camcorder, adjustment of the view finder produces motion in the image to be recorded due to the trembling motion of the camcorder.

SUMMARY OF THE INVENTION

The principal purpose of the present invention is to provide an automatic eye angle adjusting apparatus for a camcorder.

Accordingly, it is one object of the present invention to provide an automatic eye angle adjusting apparatus for automatically adjusting an angle formed by a view finder and a set in accordance with the set's motion.

Accordingly, it is another object of the present invention to provide an automatic eye angle adjusting apparatus for automatically adjusting the angle between the view finder and the set in response to the set's motion to thereby prevent rapid motion in an image to be recorded.

These and other objects, features and advantages of the present invention are provided by an automatic eye angle adjusting apparatus for an electronic view finder, which includes a set motion detector for output of a control signal in accordance with motion of the set of the camcorder and an eye angle adjustor for adjusting an angle of the electronic view finder in response to the control signal.

These and other objects, features and advantages of the invention are disclosed in or apparent from the following description of preferred embodiments.

BRIEF DESCRIPTION OF THE DRAWINGS

A fuller understanding of the nature and objects of the invention can be had by reference to the following detailed description taken in conjunction with the accompanying drawings in which.

DETAILED DESCRIPTION OF THE INVENTION

The preferred embodiment according to the present invention will now be described with reference to accompanying drawings.

Figure 1:
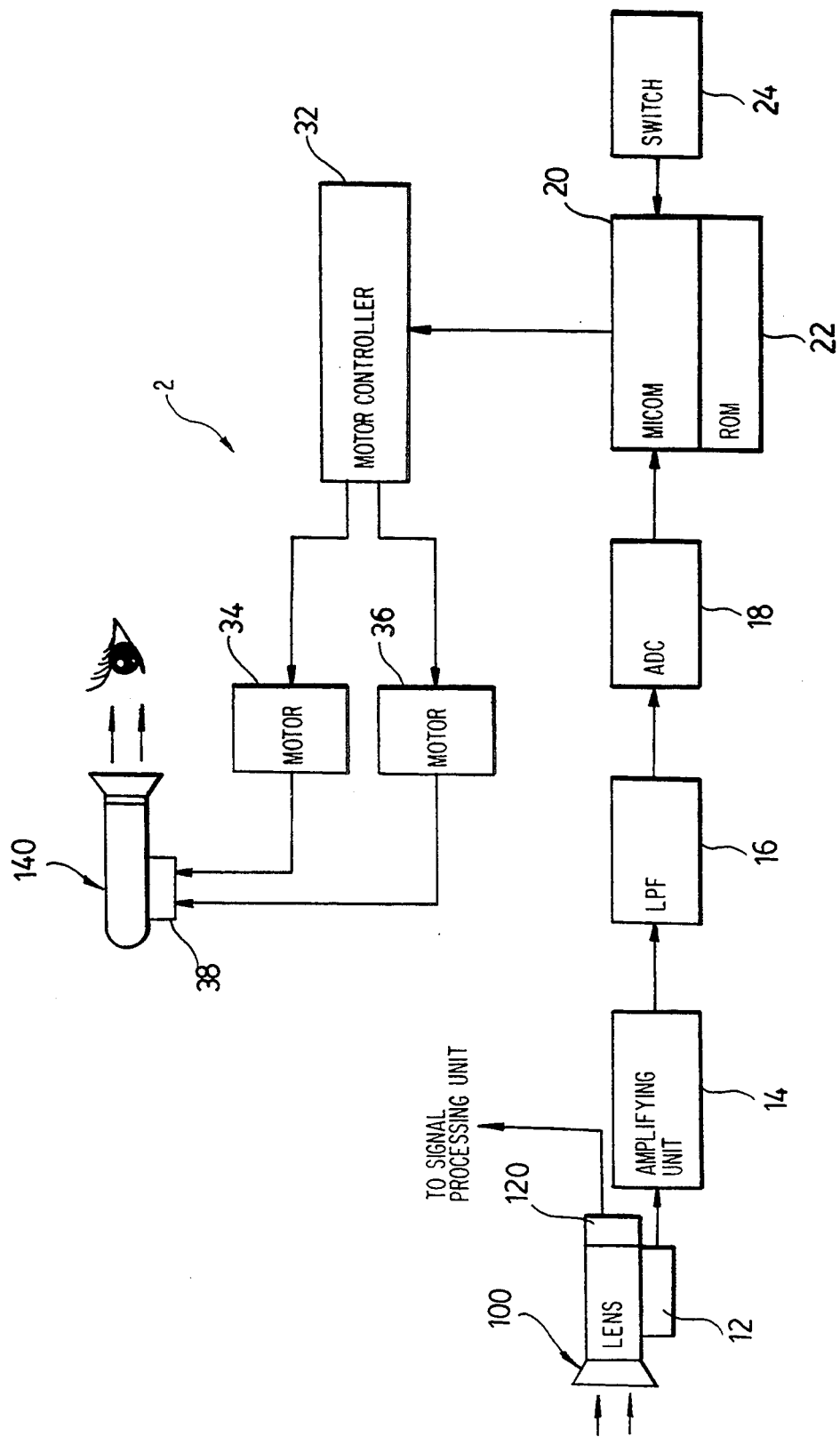
FIG. 1 is a block diagram for systematically illustrating an automatic eye angle adjusting apparatus of an electronic view finder in accordance with the present invention.

FIG. 1 is a high level block diagram for illustrating an automatic eye angle adjusting apparatus for an electronic view finder in accordance with the present invention. The adjusting apparatus advantageously includes a set motion detector for output of a control signal in accordance with motion of the body of the camcorder and an eye angle adjustor for adjusting an angle of the electronic view finder in response to the control signal.

More specifically, the set motion detector 1 in the above-described apparatus includes a position sensor 12 disposed at a lens 100 for detecting up/down and left/right motions of the set to thereby output a motion signal, an amplifier 14 for amplifying the motion signal output from position sensor 12, a Low Pass Filter (LPF) 16 for detecting an intentional motion signal out of motion signals amplified by amplifier 14, an analog-to-digital converter (ADC) 18 for converting the intentional motion signal output from LPF 16 to a digital signal and a microcomputer 20 for calculating a motion direction and magnitude of travel suitable for controlling the angle of the electronic view finder in accordance with the motion signal converted to the digital signal at the ADC 18 to thereby output the control signal.

The position sensor 12 in the above-mentioned construction preferably includes two horizontal and vertical position sensors, respectively, for detecting the motion direction and magnitude of travel of the set during a real time period. Preferably, each sensor is composed of, in an exemplary case, a piezoelectric vibrating gyro.

Preferably, microcomputer 20 includes a Read Only Memory (ROM) 22 and is operated according to the operation of an automatic eye angle adjusting switch 24. Thus, when the microcomputer 20 determines that the user has turned the automatic eye angle adjusting switch 24 ON, initiating the automatic eye angle adjusting mode, the microcomputer 20 reads from ROM 22 information about the motion direction and magnitude of travel of the view finder in accordance with the input motion signal of the set to thereby produce the control signal.

The ROM 22 is provided with recorded information about direction of movement and magnitude of travel of the view finder in accordance with the motion of the set.

Referring again to FIG. 1, the eye angle adjustor 2 advantageously may include a motor controller 32 for output of a motor driving signal in accordance with the control signal output from the set motion detector, horizonal and vertical direction driving step motors 34 and 36 that drive in accordance with the motor driving signal output from the motor controller 32 and a driver 38 driven in accordance with the step motors 34 and 36 to thereby adjust the angle of the electronic view finder 140 to a direction most suitable to the user.

Next, the operational sequence, process and effect of the automatic eye angle adjusting apparatus of the electronic view finder in accordance with the present invention will be described in detail with reference to the accompanying drawings.

Figure 2A:
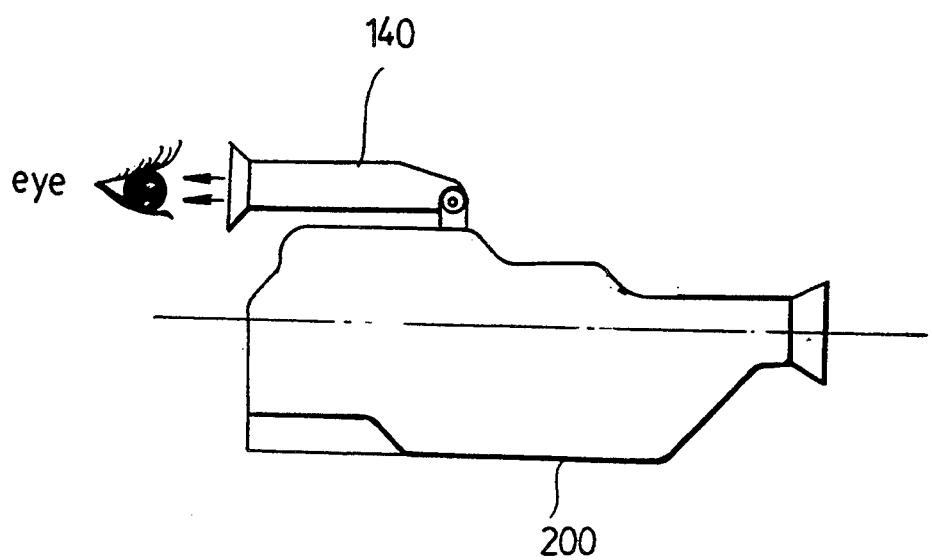
FIGS. 2A and 2B are schematic drawings of a camcorder for explaining an operational sequence of the present invention.

First of all, as illustrated in FIG. 2A, when the user operates the camcorder 200 while viewing an object through the electronic view finder 140, incident light from the object enters an image sensing element 120, which outputs an electrical signal according to the incident light to a typical signal processor (not shown). The signal processor processes the electrical signal to thereby record the same on a recording medium output the image to the electronic view finder 140, so that recording conditions can be seen by the user.

As seen from the foregoing, when the user moves the direction of the set, e.g., up, down, left, or right, beyond a predetermined angle, the position sensor 12 of the set motion detector 1 mounted on the lens 100 detects the motion direction and magnitude of travel of the set and outputs a corresponding signal to amplifier 14. At this moment, the output of the position sensor 12, which is changed in accordance with the motion of the set, represents a minute voltage. The amplifier 14 amplifies the minute voltage output from the position sensor 12 in accordance with the motion of the set to a predetermined level and outputs the same as the motion signal. LPF 16 passes low frequency signals output from amplifier 14 in the usual manner.

It will be appreciated that only the motion signal produced by an intentional movement of the camcorder, e.g., movement in pursuit of an object by the user, is passed, whereas minute motion signals generated by the trembling of the hands are interdicted.

The ADC 18 converts the motion signal which has passed LPF 16 into a digital signal and outputs the digital signal to microcomputer 20, which calculates direction to which the view finder is to be moved and the magnitude of travel, by way of the angle, based on the motion signal converted into the digital signal at the ADC 18 and the data stored in the ROM 22. Thereafter, a control signal is produced by microcomputer 20 in accordance with the calculated direction of motion and magnitude of travel.

Figure 3:
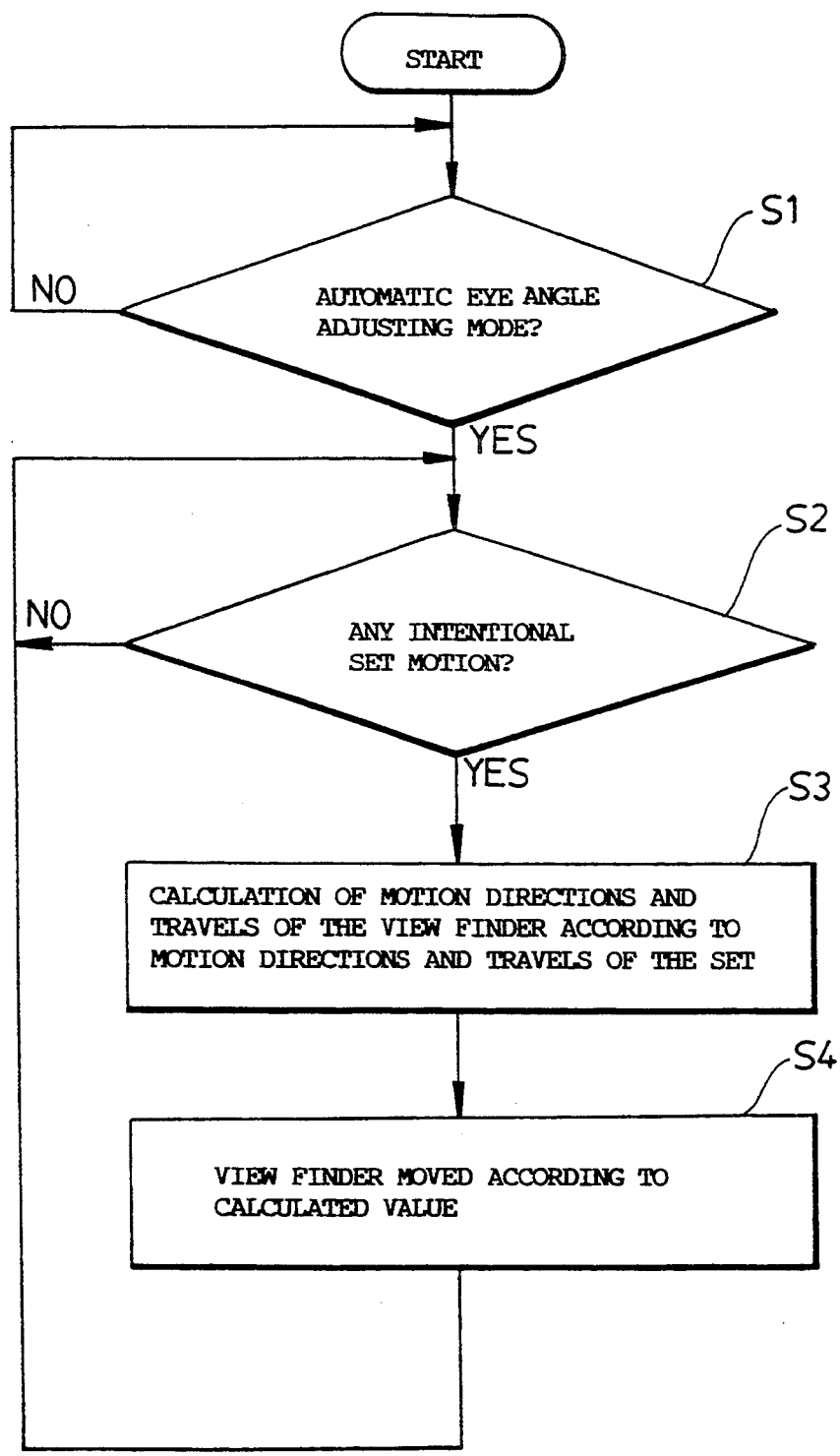
FIG. 3 is a flow chart for illustrating an operational procedure of the present invention.

At this moment, the microcomputer 20 performs the aforesaid operations in accordance with the operations of the automatic eye angle adjusting switch 24. As shown in FIG. 3, microcomputer 20 determines that the automatic eye angle adjusting mode has been set in step S1 and then determines whether or not there is any intentional set motion during step S2.

If the results of step S2 show that there has been an intentional motion of the set, e.g., moving the set to follow the motion of an object of interest, the directions to which the view finder should be moved and the magnitude of the respective travels are calculated during step S3 based on the input motion signal and the data stored in ROM 22. Then, the control signal corresponding to the calculated motion directions and magnitudes is output.

Meanwhile, motor control unit 32 of the eye angle adjustor receives the control signal output from the microcomputer 20 to thereby drive the horizontal and vertical direction driving step motors 34 and 36. Preferably, step motors 34 and 36 are activated by a control of the motor control unit 32 and drives a driver 38 to thereby position the view finder up/down or left/right during step S4. In other words, the angle (view angle) formed by the view finder and the set is automatically adjusted.

Figure 2B:
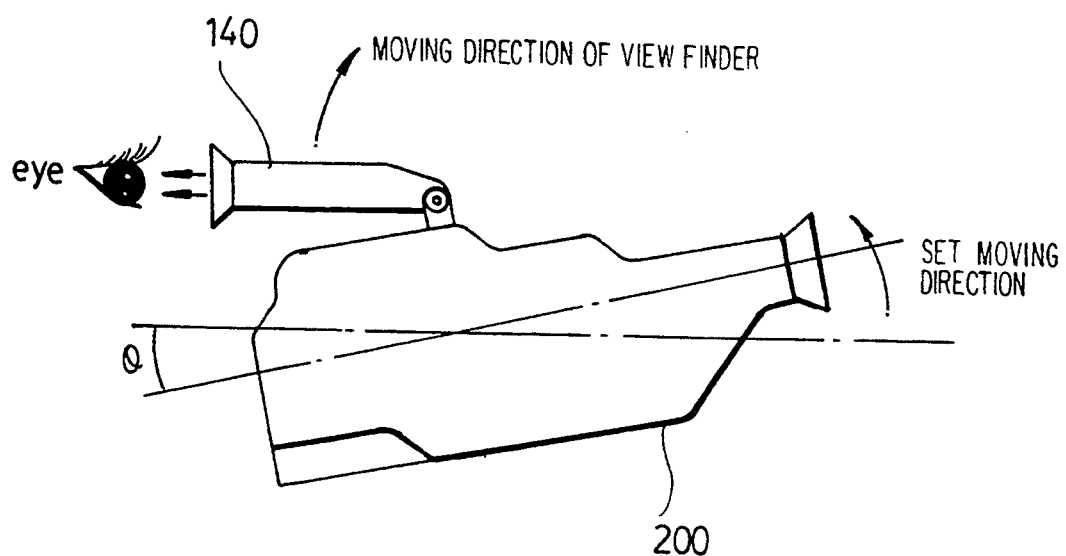

Accordingly, when the user moves the set to a predetermined angle upwardly as illustrated in FIG. 2B during filming, the view finder is automatically moved upward to thereby let the set stay in line with the eye.

As seen from the foregoing, the automatic eye angle adjusting apparatus of an electronic view finder in accordance with the present invention moves the view finder automatically according to the motion of the set when the user moves the set, so that discomfort of moving the view finder whenever the set is moved is eliminated.

Furthermore, the user does not need to move the view finder with one hand while supporting the set with the other hand to thereby obtain an effect that the recorded image is shaken by the trembling of the camcorder.

The foregoing description of the preferred embodiment has been presented for the purpose of illustration and description, and is not to be taken as limiting. Still other variations and modifications are possible without departing from the spirit and scope of the present invention. More specifically, in the above-mentioned description, although the LPF has been used in order to detect only the intentional motion generated by the user when in a pursuit of the object, it should be noted that the time the digital motion signal input from the microcomputer is above a predetermined value can be used to identify an intentional motion without recourse to the LPF.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An automatic eye angle adjusting apparatus for an electronic view finder, comprising:
    a motion detector for output of a control signal in accordance with motion of a body of a camcorder; and
    an eye angle adjuster for adjusting an angle of the electronic view finder with respect to said body in response to said control signal.

2. The automatic eye angle adjusting apparatus for an electronic view finder as defined in claim 1, wherein said motion detector comprises:
    a position sensor disposed at a lens for detecting at least one of up/down motion and left/right motion of the body and for generating a first signal;
    an amplifier for amplifying the first signal to generate a motion signal;

a low pass filter for detecting an intentional motion signal;

an analog-to-digital converter for converting the intentional motion signal output from the low pass filter to a digital signal; and a microcomputer for calculating directions of motion and magnitudes of travel corresponding to a desired angle of the electronic view finder.

3. The automatic eye angle adjusting apparatus for an electronic view finder as defined in claim 2, wherein the position sensor comprises a horizontal position sensor and a vertical position sensor, said horizontal position sensor and said vertical position sensor each generating a respective voltage in accordance with motion of said body.

4. The automatic eye angle adjusting apparatus for an electronic view finder as defined in claim 2, wherein the microcomputer is operatively connected to a memory storing information related to movement of the view finder in accordance with said digital signal.

5. The automatic eye angle adjusting apparatus for an electronic view finder as defined in claim 4, wherein said memory is a read only memory.

6. The automatic eye angle adjusting apparatus for an electronic view finder as defined in claim 2, wherein the microcomputer is operatively connected to a switch, operation of said switch being indicative of an automatic eye angle adjusting mode.

7. The automatic eye angle adjusting apparatus for an electronic view finder as defined in claim 1, wherein the eye angle adjustor comprises:

a motor controller for generating a motor driving signal in response to said control signal output from the set motion detector;

a plurality of step motors driven in response to said motor driving signal output from the motor controller; and a driver driven by said step motors to adjust a viewing angle of the electronic view finder.

8. The automatic eye angle adjusting apparatus for an electronic view finder as defined in claim 7, wherein the step motors comprise an up/down driving step motor and a left/right driving step motor and wherein said motor driving signal includes an up/down driving signal and a left/right driving signal output from the motor control unit.

9. The automatic eye angle adjusting apparatus for an electronic view finder as defined in claim 8, wherein the driver adjusts said viewing angle in at least one of an up direction, a down direction, a left direction and a right direction.

10. An automatic eye angle adjusting apparatus for an electronic view finder as defined in claim 7, wherein the driver adjusts said viewing angle in at least one of an up direction, a down direction, a left direction and a right direction.

11. A method for controlling an automatic eye angle adjusting apparatus for an electronic view finder, said method comprising the steps of:

(a) determining motion of a body on which said view finder is mounted;

(b) calculating directions of motion and magnitudes of travel corresponding to said motion of said body; and (c) adjusting an angle of the electronic view finder with respect to said body in response to said motion of said body.

12. The method as defined in claim 11, wherein said step (a) comprises the steps of:

(d) determining whether an automatic eye angle adjusting mode of operation has been initiated; and (e) determining whether any intentional of said body motion has occurred.

* * * * *